United States Patent
Eich et al.

(10) Patent No.: US 6,850,829 B2
(45) Date of Patent: Feb. 1, 2005

(54) METHOD FOR CONTROLLING A TRANSMISSION

(75) Inventors: Jürgen Eich, Bühl (DE); Thomas Jäger, Meckenbeuren (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/617,248

(22) Filed: Jul. 9, 2003

(65) Prior Publication Data

US 2004/0063542 A1 Apr. 1, 2004

Related U.S. Application Data

(63) Continuation of application No. PCT/DE01/04779, filed on Dec. 17, 2001.

(30) Foreign Application Priority Data

Jan. 9, 2001 (DE) .......................................... 101 00 644

(51) Int. Cl.[7] .............................................. G06F 7/00

(52) U.S. Cl. ........................................... 701/67; 701/51

(58) Field of Search .............................. 701/67, 68, 51, 701/54; 477/34

(56) References Cited

U.S. PATENT DOCUMENTS

6,676,561 B2 * 1/2004 Fritzer et al. .................. 477/70

FOREIGN PATENT DOCUMENTS

| DE | 195 04 847 A1 | 9/1995 |
| DE | 197 16 828 A1 | 11/1997 |
| DE | 199 25 664 A1 | 12/2000 |
| EP | 1 065 401 A2 | 1/2001 |

* cited by examiner

*Primary Examiner*—Y. Beaulieu
(74) *Attorney, Agent, or Firm*—Darby & Darby

(57) ABSTRACT

In a method for controlling an automated clutch and/or an automated transmission in a motor vehicle with an electronic clutch management system, a target value for the clutch torque is determined as an output quantity of a start-up function dependent on suitable input quantities.

28 Claims, 4 Drawing Sheets

METHOD FOR CONTROLLING A TRANSMISSION

CROSS-REFERENCE TO RELATED APPLICATION

This application is a continuation of International Patent Application Ser. No. PCT/DE01/04779 filed Dec. 17, 2001, which is hereby incorporated by reference in its entirety.

BACKGROUND OF THE INVENTION

The present invention relates to a method for the control and/or regulation of an automated clutch and/or an automated transmission of a vehicle, wherein a target value for the clutch torque is determined by means of an electronic clutch management system (ECM). The invention further relates to a control- and/or regulation device, as well as an automated transmission.

Automated clutches and/or automated transmissions are known from the field of automotive technology as a means by which a complete automation of the drive train of a vehicle, in particular a motor vehicle, is made possible. A clutch-engaging process during a desired gear-shifting process is automated by means of an electronic clutch management system (ECM).

To achieve this purpose, it is necessary that an appropriate target amount for the clutch torque at the current operating conditions is determined with the aid of the automated clutch. In particular during the start-up phase of a motor vehicle, more demanding requirements are placed on the clutch management system. For example, possibilities for driver input must be taken into consideration to a certain extent, and changed operating conditions, e.g. an increase in engine torque in turbo engines, or properties of the clutch, must also be taken into account.

OBJECT AND SUMMARY OF THE INVENTION

The object of the invention is to provide a method for the control and/or regulation of an automated clutch and/or an automated transmission with an improved functionality of the electronic clutch management in particular during the start-up phase.

To meet the foregoing objective, the invention provides a method wherein the electronic clutch management determines a start-up function that depends on predetermined input parameters and delivers the target value for the clutch torque as an output parameter which is then set at the clutch of the vehicle. As a consequence, the start-up rpm-rate in a motor vehicle with automated clutch control and/or transmission control can to a greater extent conform to the desire of the driver as it manifests itself, e.g., through a position of the accelerator pedal or the throttle valve. The functionality of the electronic clutch management in the start-up phase is expanded so that in particular a defined engine rpm-rate can be set during the start-up phase. This provides the possibility of an improved reproducibility of vehicle starts from a standstill under variable operating conditions.

According to an advantageous development of the invention, the target value for the clutch torque can be determined by means of the start-up function dependent on input parameters that include at least one of the following: accelerator pedal angle, engine rpm-rate, transmission input rpm-rate and/or engine torque.

Under a proposed concept of the invention, the start-up function is essentially divided into two phases with the aid of a factor calculation. Of course, it is also possible to provide additional phases in order to further optimize the start-up process in a vehicle.

According to an advantageous concept of the inventive method, the factor calculation in a first phase of the regulation preferably ensures that the engine rpm-rate essentially follows a targeted start-up rpm-rate. In a second phase, in contrast, a matching of the engine rpm-rate and the transmission input rpm-rate is required in order to synchronize the two rpm-rates. This avoids a sharp switch-over between the phases, and a continuous change-over of the two phases is made possible within the start-up process as a function of a so-called rpm-ratio, which is defined as the quotient between transmission input rpm-rate and engine rpm-rate.

An advantageous embodiment of the invention provides that to calculate the target value for the clutch torque as the output quantity, the first step is to determine a torque contribution in accordance with a global control function. This can be accomplished, e.g., by determining contributing factors as functions of the transmission input rpm-rate and/or the engine rpm-rate. Moreover it is also possible to use an engine-torque-dependent contribution. It is particularly advantageous, however, if the engine-torque-dependent portion is suitably weighted by means of the rpm-ratio so that the engine-torque-dependent portion achieves its full effectiveness at the clutch just as the point of synchronization is reached. Of course, it is also conceivable to use additional contributing factors in determining the start-up function.

It has been found that a suitable gradient limitation for example of the engine-torque-dependent portion is particularly advantageous in order to further improve the start-up functionality of the electronic clutch management by means of the method according to the invention.

The above-mentioned portions or contributions can be supplemented e.g. by appropriate contributing parts of the regulation that have the purpose of ensuring the above-mentioned phase-specific tasks.

According to another development of the invention, for example at lower values of the rpm-ratio, for example if the value of the rpm-ratio (SR) is less than about 0.5 to 0.7, an initial regulation of the targeted start-up rpm-rate may be of primary concern. It is possible for the start-up rpm-rate to be determined through a suitable, e.g., monotonically increasing characteristic curve as a function of the accelerator pedal angle. Of course, it is also possible to use any other, differently defined characteristic curve, if desired.

To avoid that rapid and/or occasionally opposite changes of the accelerator pedal angle or of the throttle valve angle produce changes in the target value for the clutch torque, the determined starting rpm-rate is for example low-pass-filtered, preferably with a PT1 element. It is also conceivable that other filter elements can be used.

According to an advantageous development, the filter function is initialized by means of the engine rpm-rate, in particular when the engine rpm-rate in neutral gear considerably exceeds an idle rpm-rate of, e.g., about 500 rpm. Of course, the initialization can also take place at lower or higher values.

The difference $f_1(SR)*(n\_start - n\_eng)$ weighted by the rpm-ratio in the factor calculation can be converted e.g. via a PI (proportional/integrating) controller into a contribution to the target value for the clutch torque. The PI controller can have as parameters the factor KP1 of the proportional term and the factor KI1 of the integrating term. Of course, another controller and/or other parameters can also be used.

In particular for higher values of the rpm-ratio, e.g., if the value of the rpm-ratio (SR) is larger than 0.6 to 0.9, the attainment of the synchronous point can become the primary concern in the factor calculation. It is conceivable that the attainment of the synchronous point can also receive primary attention at rpm-ratios that differ from the aforementioned values.

According to a further developed version of the invention, a PI controller can also be used whose input quantity represents, e.g., $f_2(SR)*(n\_eng-n\_trsm)$. Preferably the PI controller uses as parameters the factor KP2 of the proportional term and the factor KI2 of the integrating term. Here too, the use of other controllers and/or parameters is possible.

A further development of the invention provides that the I-terms of the two regulations are preferably implemented by the same integrator. This advantageously reduces the complexity of the circuit that is used in the implementation of the regulation. In addition to the existing integrator, it is also possible to use an additional integrator, for example in a serial arrangement. The additional integrator can for example have a smaller amplification KI3, in order to counteract continuous slip of the clutch, for example due to ramp-shaped disturbance variables such as a continuously increasing engine torque. It is conceivable to use additional integrators, also in a different circuit configuration, as well as larger or smaller amplification factors.

According to another development of the inventive method, the target value for the clutch torque determined as the output quantity is subject to a limitation. For example, the target value for the clutch torque (M_Rtrgt) can be limited by the condition M_Rtrgt=0. If the target value for the clutch torque is subject to such a limitation, the one or more integrators used in the control system can be subject to a suitable measure to avoid a so-called wind-up. This can be achieved, e.g., by calculating backwards to a corresponding I-portion (M_I) of the torque after setting a limit for the target value for the clutch torque. This can preferably be done by subtracting the torque contribution of the global control (M_glob) and a damping torque portion (M_D), as well as by adding the proportional portions M_P1 and M_P2 of the PI-controller of the first and second phase in the factor calculation, from or to the limited target value for the clutch torque (M_Rtrgt_lim).

This can be expressed through the following equation:

$$M\_I=M\_Rtrgt\_lim-M\_glob-M\_D+M\_P1+M\_P2$$

wherein

M_Rtrgt_lim=limited target value for the clutch torque

M_D=damping torque portion

M_P1=P-portion of the torque in the first phase

M_P2=P-portion of the torque in the second phase

Of course, other or additional portions can also be taken into consideration in backwards-calculating to the I-portion of the torque.

According to a further variant of the inventive method, a damping portion can enter into the determination of the start-up function. This damping portion can be processed both in the first phase, i.e., during the initiation of the regulation of the starting rpm-rate, and in the second phase of the factor calculation, i.e., during synchronizing or slip reduction. In the first phase, the use of the damping portion can advantageously prevent a sharp change, e.g., in the engine rpm-rate. In the second phase or synchronizing phase, the damping portion is preferably applied to the difference between engine rpm-rate and transmission input rpm-rate.

According to another development of the invention, in determining the target value for the clutch torque by means of the start-up function, e.g., the transmission input rpm-rate- and/or engine-rpm-rate-dependent portion is omitted. Of course, any other desired portions can be reduced or omitted in order to further optimize the overall determination of the start-up function in the inventive method.

In a further variation of the invention it is advantageous if, e.g., a throttle-valve-dependent portion $K(\alpha)$ is used in determining the start-up function. By introducing the portion $K(\alpha)$, one obtains the following equation for M_Rtrgt:

$$M\_Rtrgt=K(\alpha)*f(n\_eng)$$

wherein $f(n\_eng)$ stands for a function that depends on the engine rpm-rate.

According to the invention, this throttle-valve-dependent portion can be used either alone or in combination with the already named portions for determining the start-up function. By using the throttle-valve-dependent portion, the target value for the clutch torque can be reduced, e.g., when the throttle valve angle increases, in order to raise the starting rpm-rate and to prevent a condition where the engine rpm-rates stay practically the same over large range of torque loads during the start-up process. In particular the throttle-valve-dependent term and/or the engine-rpm-rate-dependent term can be reduced in the calculation of the target value for the clutch torque.

Taking the stationary and dynamic processes into consideration during a start-up process of a motor vehicle, a further embodiment of the invention includes the provision that at least the gradient of a portion is suitably limited in the determination of the start-up function. Limiting the gradient of the throttle-valve-dependent term and/or the engine-rpm-rate-dependent term is particularly advantageous. By a suitable selection of the limits, in particular in the gradient of the throttle-valve-dependent term, the influence of the the throttle-valve-dependent term can be reduced to such an extent that undesired acceleration of the vehicle can be avoided.

In particular the dynamic processes during a start-up phase are represented by the following equation $$\frac{d}{dt}M\_Rtrgt = f(n\_eng)*\frac{dK(\alpha K}{d\alpha}*\frac{d\alpha}{dt} + K\left(\alpha(*\frac{df(n\_eng)}{dn\_eng}*\frac{dn\_eng}{dt}\right)$$

wherein n_eng represents the engine rpm-rate and $K(\alpha)$ represents the throttle-valve-dependent term.

During a load change, in particular a so-called tip-in (abrupt depression of the gas pedal), a breakdown of the target value for the clutch torque subsequent to the tip-in can largely be avoided by means of a suitable limitation of the gradient of the throttle-valve-dependent term. Depending on the operating conditions, a suitable limitation of the gradient must be found in order to ensure an optimized starting process overall.

A limitation of the amount of the gradient is also advantageous during another type of engine-load change, in particular a back-out (sudden let-up on the gas pedal). An undesired closing of the clutch during the back-out can be completely suppressed by means of an extremely flat increase of the throttle-valve-dependent term.

The inventive method as described herein can in principle be used in an electronic clutch management system (ECM) and also in an automated shift transmission (AST). Moreover it is also conceivable that the method according to the invention can be used in a continuously variable transmission (CVT).

BRIEF DESCRIPTION OF THE DRAWINGS

Advantageous embodiments of the invention are revealed in the drawings and their description, wherein:

FIG. 3 shows a time graph of a start-up process with a tip-in; and

DETAILED DESCRIPTION OF PREFERRED EMBODIMENTS

Figure 1:
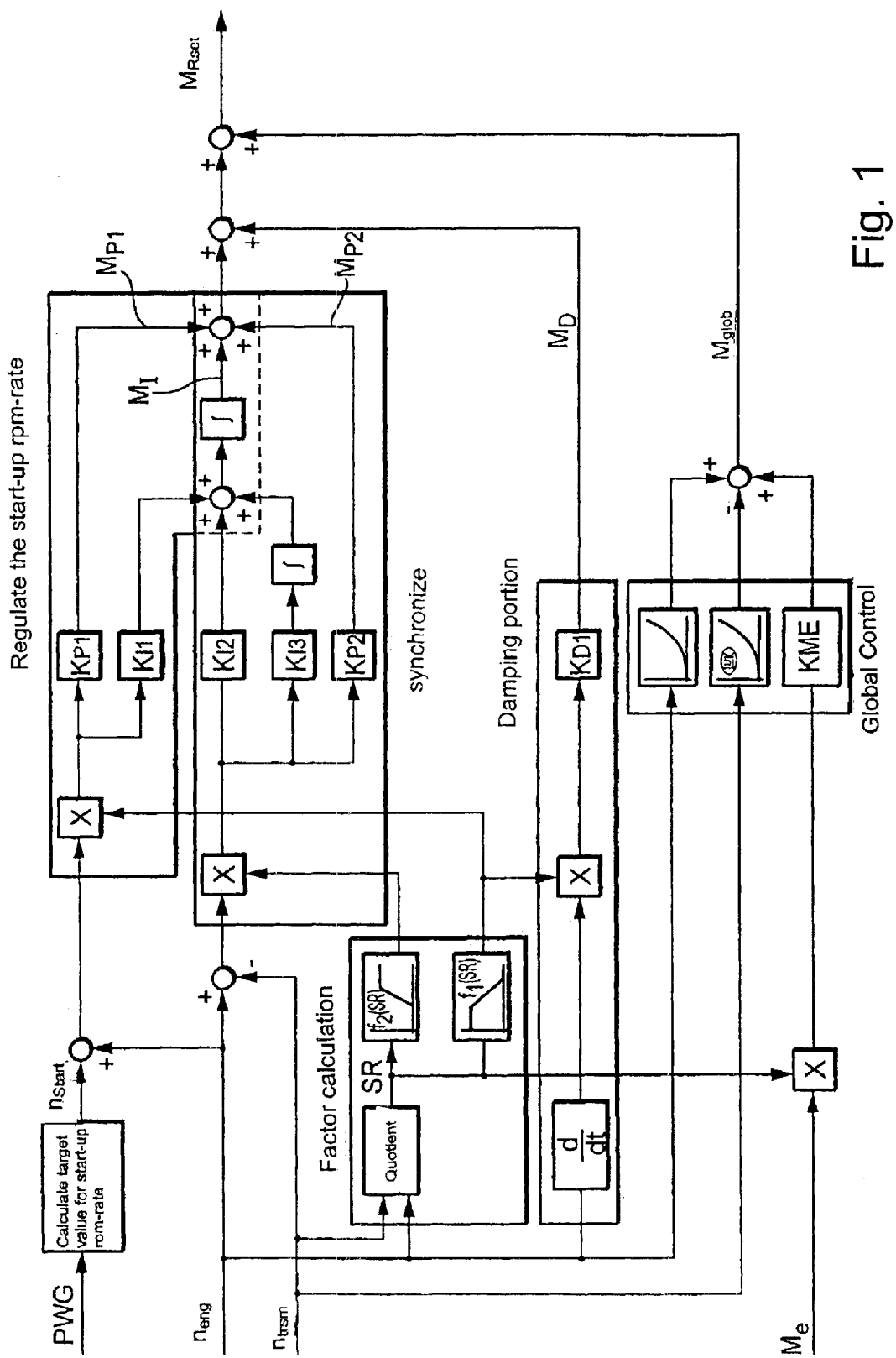
FIG. 1 represents a block diagram of the method according to the invention.

FIG. 1 illustrates a start-up strategy in the form of a block diagram. The illustrated strategy, in which the start-up rpm-rate is regulated, is in particular compatible with a global control concept.

In the start-up strategy of FIG. 1, the accelerator pedal angle PWG, the engine rpm-rate n_eng, the transmission input rpm-rate n_trsm, and the engine torque Me represent the input quantities. These input quantities are processed to produce the target value for the clutch torque M_Rtrgt which represents the output quantity.

Based on the accelerator pedal angle, a start-up rpm-rate is determined through a calculation of a target value for the start-up rpm-rate. The start-up rpm-rate is aligned with the engine rpm-rate and serves as an input quantity for the first phase (regulation of the start-up rpm-rate). This input parameter is converted into torque contributions M_P1 and M_I by way of a PI controller with the parameters KP1 and KI1.

The engine rpm-rate is brought in line with the transmission input rpm-rate and serves as an input quantity for the synchronizing phase. The synchronization block of FIG. 1 also contains a PI controller with the parameters KI2 and KPp2, so that a torque contribution M_P2 is delivered at the output. The I-portion of the PI controller is added to the I-portion of the PI controller assigned to the block representing the regulation of the starting rpm-rate and fed to an integrator. The output quantity of the integrator represents the torque portion M_I.

The engine rpm-rate and the transmission input rpm-rate serve as input quantities for the factor calculation, in which an rpm-ratio SR defined by the quotient SR of transmission input rpm-rate and engine rpm-rate represents a weight factor. The weighting is carried out by the functions $f_1(SR)$ and $f_2(SR)$. The function $f_1$ (SR) serves as an input quantity for the block representing the regulation of the start-up rpm-rate and the function $f_2$ (SR) serves as an input quantity for the block representing the rpm-synchronization.

The engine rpm-rate is also used as an input quantity for the damping portion. In the damping portion, the function $f_1$ (SR) exerts an additional influence, so that a damping torque contribution M_D is delivered at the output of the block that represents the damping portion.

The engine torque is weighted by means of the factor calculation and forms an input quantity for the global control. The engine rpm-rate and the transmission input rpm-rate are also provided as input quantities for the global control. A torque contribution M_glob is output as a combined output quantity.

The damping torque contribution M_D is superimposed on the combined output quantities of the blocks representing the regulation of the start-up rpm-rate and the synchronization. The output quantity formed thereby is then added to the torque contribution M_glob and as a final result represents the desired target value for the clutch torque M_Rtrgt as an output quantity.

Figure 2:
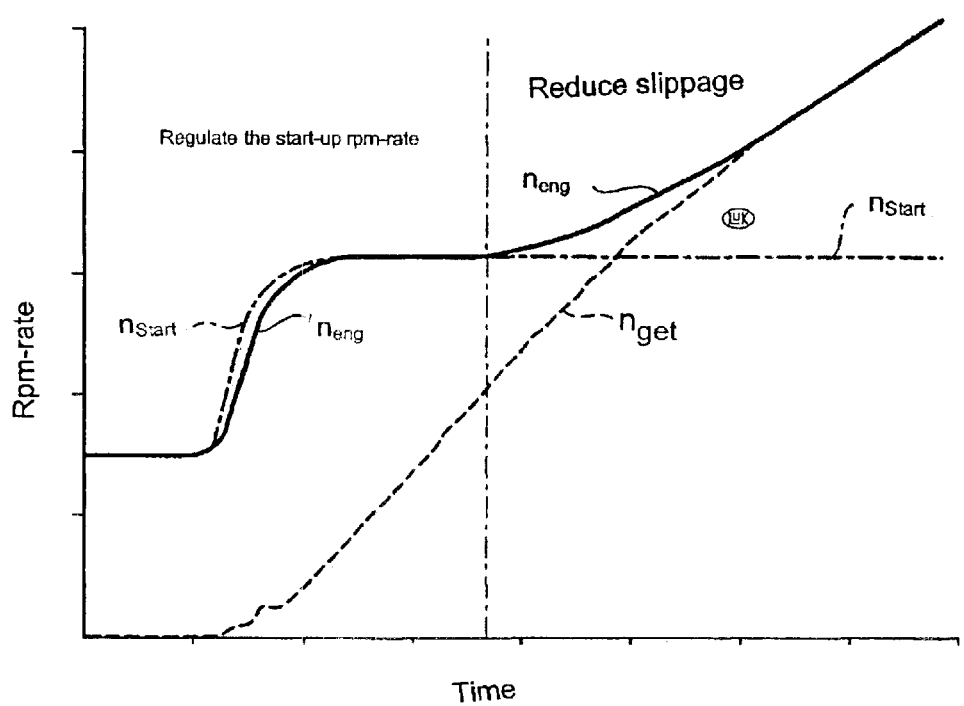
FIG. 2 shows a time graph of a typical start-up process.

FIG. 2 shows a starting process in the form of a time graph. The diagram is divided into the first phase (regulation of the start-up rpm-rate) and the second phase (synchronization or slip reduction). The time profiles of the start-up rpm-rate n_start, the engine rpm-rate n_eng, and the transmission input rpm-rate n_trsm are shown in the diagram.

It is clear that in the first phase the engine rpm-rate is adjusted to the start-up rpm-rate so that at the end of the first phase the two rpm-rates are equal. At the beginning of the second phase (synchronizing phase), the engine rpm-rate is adjusted to the transmission input rpm-rate and thus leaves the time graph of the starting rpm-rate.

After about 3 seconds, the engine rpm-rate and transmission input rpm-rate are approximately identical, so that the further time profiles of the engine rpm-rate and the transmission input rpm-rate are identical. From this point on, the engine rpm-rate and the transmission input rpm-rate are synchronized.

Figure 3:
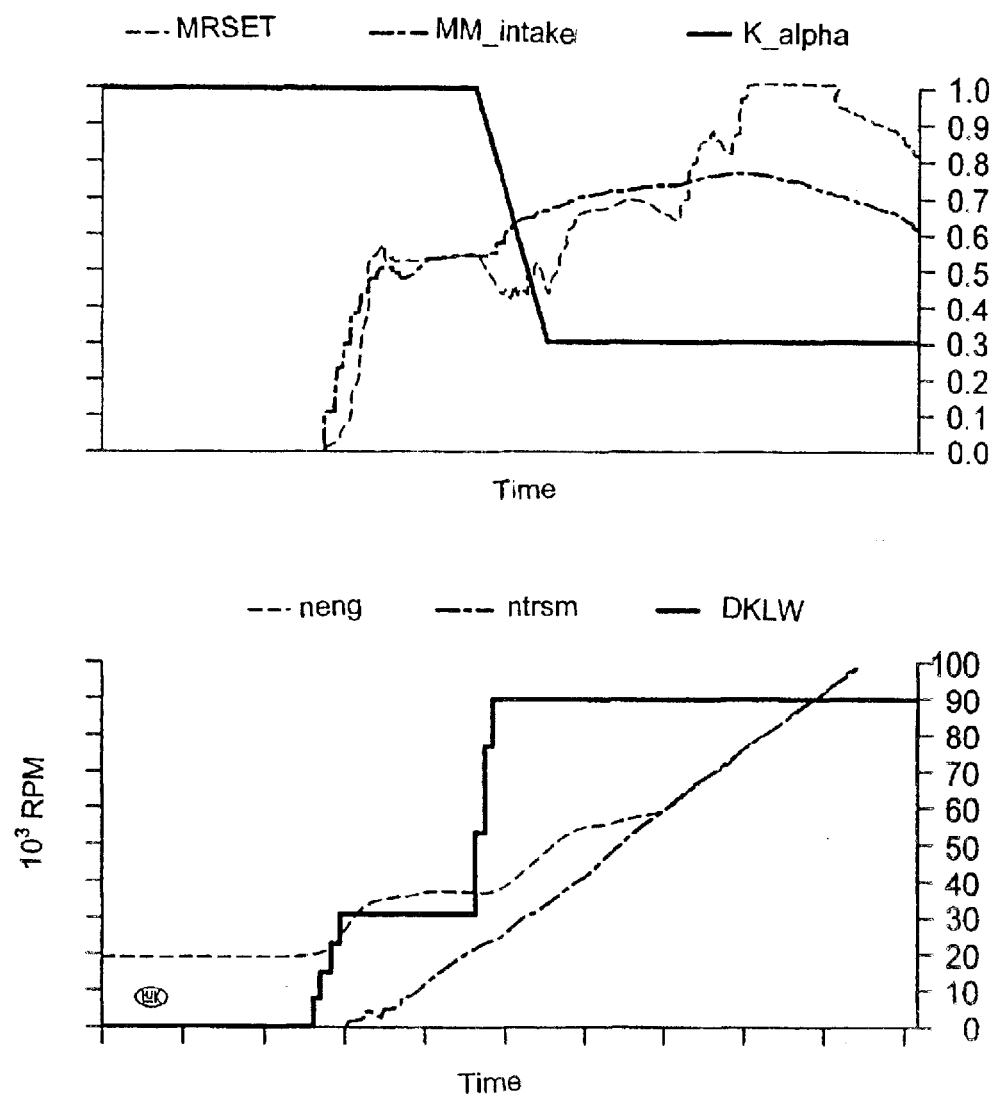

FIG. 3 shows a start-up process with a so-called tip-in. The diagram includes two curves, wherein the target value for the clutch torque M_Rtrgt and the engine rpm-rate n_eng as functions of time are shown as broken lines, the transmission input rpm-rate n_trsm as a dash-dotted line, and both a throttle-valve-dependent factor $K(\alpha)$ and the throttle valve angle TVA as solid lines.

The effect of the gradient limitation of $K(\alpha)$ in a start-up process with tip-in is clear from the diagram. The limited gradient of $K(\alpha)$ can be seen in the upper illustration. Due to this limitation, a breakdown of the target value for the clutch torque M_Rtrgt subsequent to the tip-in can largely be avoided. It must be noted, however, that a compromise must be made in matching the gradient.

Figure 4:
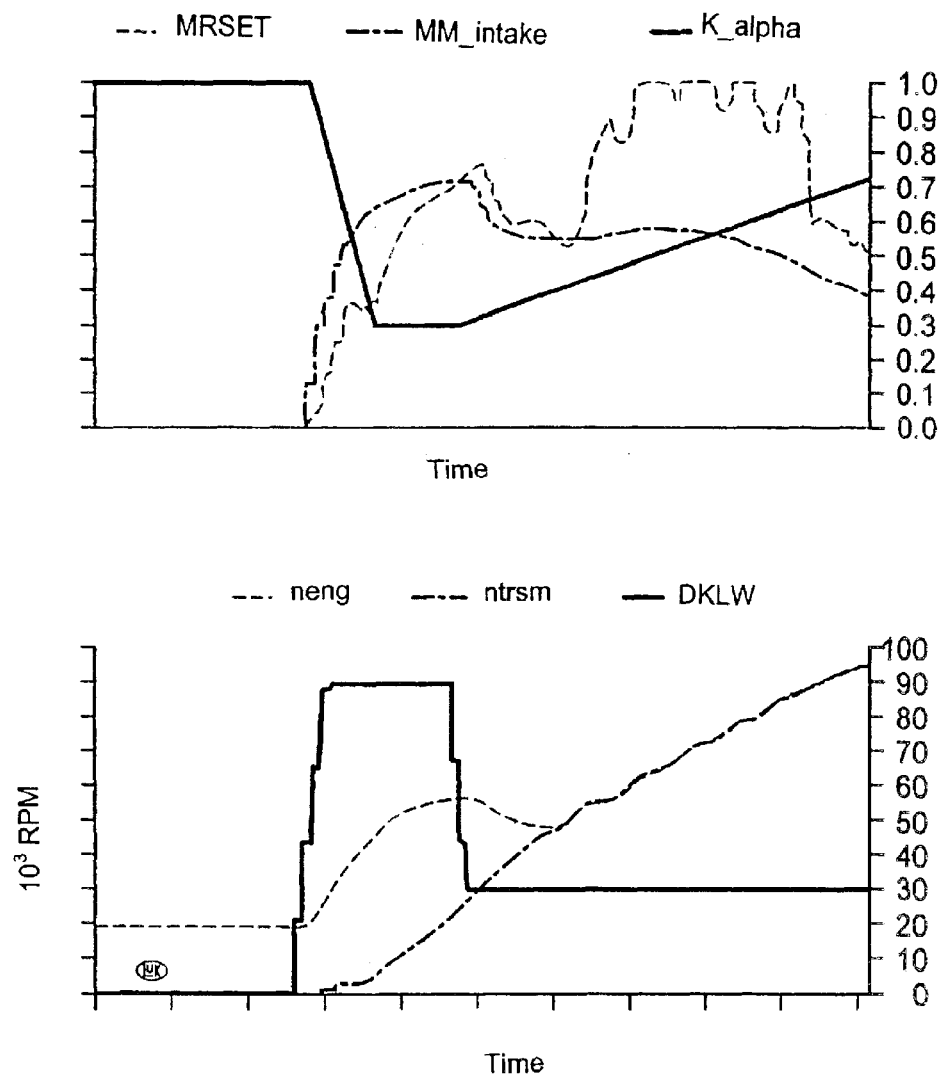
FIG. 4 shows a time graph of a start-up process with a back-out.

FIG. 4 shows a starting process with back-out. The diagram includes two graphs, wherein the target value for the clutch torque M_Rtrgt and the engine rpm-rate n_eng as functions of time are shown as broken lines, the transmission input rpm-rate n_trsm as a dash-dotted line, and both a throttle-valve-dependent factor $K(\alpha)$ and the throttle valve angle TVA as solid lines.

The effect of the gradient limitation of $K(\alpha)$ in a starting process with back-out is clear from the diagram. The limited gradient of $K(\alpha)$ can be seen in the upper illustration. A sudden closing of the clutch prior to the synchronization of n_eng and n_trsm can be completely suppressed by means of an extremely flat increase of $K(\alpha)$.

A gradient limitation on one or more portions is advantageous for the determination of the target value for the clutch torque, so that in particular the start-up functionality of an automated clutch and/or an automated transmission is improved.

Without further analysis, the foregoing will so fully reveal the essence of the present invention that others can, by applying current knowledge, readily adapt it for various applications without omitting essential generic or specific features that set the present invention apart from the prior state of the art. Therefore, such adaptations should be understood to fall within the scope and range of equivalence of the appended claims.

What is claimed is:

1. A method for controlling at least one of an automated clutch and an automated transmission in a motor vehicle, wherein the method is performed by an electronic clutch management system and comprises the steps of:

determining a start-up function that depends on predetermined input parameters which include at least one of the group consisting of accelerator pedal angle, engine rpm-rate, transmission input rpm-rate, and engine torque;

delivering a target value for a clutch torque as an output parameter of the start-up function;

dividing the start-up function substantially into at least two phases by means of a factor calculation, wherein in a first phase of said two phases the engine rpm-rate is substantially regulated to follow a targeted starting rpm-rate, and in a second phase of said two phases, the engine rpm-rate is synchronized with the transmission input rpm-rate.

2. A method for controlling at least one of an automated clutch and an automated transmission in a motor vehicle, wherein the method is performed by an electronic clutch management system and comprises the steps of:

determining a start-up function that depends on predetermined input parameters which include at least one of the group consisting of accelerator pedal angle, engine rpm-rate, transimission input rpm-rate, and engine torque;

delivering a target value for a clutch torque as an output parameter of the start-up function; wherein the step of determining the target value for the clutch torque comprises determining a torque contribution in accordance with a global control function, said torque contribution being determined as a combination of contributing factors that are functions of at least one of the transmission input rpm-rate and the engine rpm-rate and further include an engine-torque-dependent contribution (KME*Me).

3. The method according to claim 2, wherein said engine-torque-dependent contribution is weighted with an rpm-ratio SR=n_trsm/n_eng, wherein n trsm represents the transmission input rpm-rate and n eng represents the engine rpm-rate, so that when synchronism is achieved at the clutch, the engine-torque-dependent portion is substantially fully effective.

4. The method according to claim 3, wherein the weighted engine-torque-dependent contribution (SR*KME*Me) is subject to a limitation of its time gradient.

5. The method according to claim 4, wherein said combination of contributing factors is supplemented by at least one controller contribution in order to ensure the performance of phase-specific tasks in the start-up function.

6. The method according to claim 3, wherein at values of the rpm-ration (SR) below 0.7 priority is given to regulating a start-up rpm-rate (n_start) in accordance with a target value and wherein said start-up rpm-rate is determined by means of a characteristic curve at least as a function of an accelerator pedal angle.

7. The method according to claim 6, wherein the start-up rpm-rate is further processed through a filter.

8. The method according to claim 7, wherein said filter comprises a low-pass filter.

9. The method according to claim 7, wherein the filter is initialized with the engine rpm-rate (n_eng) if the engine rpm-rate (n_eng) in neutral gear considerably exceeds an idling rpm-rate.

10. The method according to claim 5, wherein a weighted difference ($f_1(SR)*(n\_start-n\_eng)$) with a weight factor $f_1(SR)$ being a function of the rpm-ratio (SR) is converted through a proportional/integrating controller into a contribution to a target value for the clutch torque (M_Rtrgt).

11. The method according to claim 3, wherein at values of the rpm-ratio (SR) above 0.6 priority is given to attaining synchronism and a proportional/integrating controller is used, wherein a weighted difference ($f_2(SR)*(n\_eng-n\_trsm)$) with a weight factor $f_2(SR)$ being a function of the rpm-ration (SR) serves as an input signal to the proportional/integrating controller and is converted into a contribution to a target value for the clutch torque M_Rtrgt.

12. The method according to claim 10, wherein a first weighted difference ($f_1(SR)*(n\_start-n\_eng)$) and a second difference ($f_2(SR)*(n\_start-n\_eng)$) with weight factors $f_1(SR)$ and $f_2(SR)$ being functions of the rpm-ratio (SR) are each converted by their own proportional/integrating controller into a contribution to a target value for the clutch torque (M_Rtrgt), and wherein the respective integrating portions of the two proportional/integrating controllers are implemented by a joint integrator.

13. The method according to claim 12, wherein an additional integrator is used in addition to the joint integrator.

14. The method according to claim 13, wherein the additional integrator is arranged in series with the joint integrator, and wherein the additional integrator uses a smaller amplification parameter (KI3) than the joint integrator.

15. The method according to claim 13, wherein the target value for the clutch torque (M_Rtrgt) determined as the output quantity is subject to a limitation.

16. The method according to claim 15, wherein in limiting the target value for the clutch torque (M_Rtrgt) at least in a first phase where the target value for the clutch torque (M_Rtrgt) is low, a new start-up function is matched to an existing start-up function, and the new start-up function is allowed to diverge from the existiong start-up function only in a second phase where the target value for the clutch torque (M_Rtrgy) increases.

17. The method according to claim 16, wherein in limiting the target value for the clutch torque (M_Rtrgt), each integrator is subjected to a measure to avoid a so-called wind-up.

18. The method according to claim 17, wherein after limiting the target value for the clutch torque (M_Rtrgt), an integral portion (M_I) is calculated according to the equation:

$$M\_I = M\_Rtrgt\_lim - M\_glob - M\_D + M\_P1 + M\_P2, \text{ wherein}$$

M_Rtrgt_lim=limited target value for the clutch torque

M_D=damping torque portion

M_P1=proportional torque portion of the proportional/integrating controller in the first phase, and M_P2=proportional torque portion of the proportional/integrating controller in the second phase.

19. The method according to claim 18, wherein the damping torque portion (M_D) is used in determining the start-up function.

20. The method according to claim 18, wherein the damping torque portion (M_D) is used in at least one of regulating the starting rpm-rate during the first phase and synchronizing the engine rpm-rate with a transmission rpm-rate during the second phase.

21. The method according to one of claim 20, wherein at least one of the transmission input rpm-rate (n_trsm) and the engine rpm-rate (n_eng) is disregarded in determining the start-up function.

22. The method according to claim 16, wherein a throttle-valve-dependent portion ($K(\alpha)$) is used in determining the start-up function.

23. The method according to claims 22, wherein the target value for the clutch torque (M_Rtrgt) conforms to the equation:

M_Rtrgt=K(α)*f(n_eng), wherein f(n_eng) represents a function of the engine rpm-rate.

24. The method according to one of claim 23, wherein the time derivative of the clutch torque (M_Rtrgt) conforms to the equation:

$$\frac{d}{dt}\text{M\_Rtrgt} = f(\text{n\_eng}) * \frac{dK(\alpha)}{d\alpha} * \frac{d\alpha}{dt} + K(\alpha) * \frac{df(\text{n\_eng})}{d\text{n\_eng}} * \frac{d\text{n\_eng}}{dt},$$

wherein n_eng represents the engine rpm-rate and K(α) represents the throttle-valve-dependent portion.

25. The method according claim 24, wherein at least one of the throttle-valve-dependent portion (K(α)) and the engine-rpm-rate-dependent portion f(n_eng) is subject to a limitation of its respective time gradient.

26. The method according to claim 25, wherein the time gradient dK(α)/dt is subject to a limitation designed to reduce the influence of K(α) in such a way that undesired accelerations of the vehicle are avoided.

27. The method according to claim 24, wherein a drop in the target value for the clutch torque (M_Rtrgt) during an engine-load change as a result of an abrupt depression of the gas pedal is avoided by imposing a limitation on the time gradient (dK(α)/dt).

28. The method according to claim 24, wherein a sudden closing of the clutch during an engine-load change as a result of an abrupt let-up on the gas pedal is avoided by imposing a limitation on the time gradient (dK(α)/dt).

* * * * *